United States Patent [19]

Lister

[11] 3,965,391
[45] June 22, 1976

[54] BALANCED DRIVE HORIZONTAL DEFLECTION CIRCUITRY WITH CENTERING

[75] Inventor: John W. Lister, Portsmouth, Va.

[73] Assignee: General Electric Company, Portsmouth, Va.

[22] Filed: June 4, 1974

[21] Appl. No.: 476,204

[52] U.S. Cl. ............................. 315/408; 315/399; 315/406; 315/411
[51] Int. Cl.² ..................................... H01J 29/70
[58] Field of Search .......... 315/387, 388, 406, 403, 315/411, 407, 408, 398

[56] References Cited
UNITED STATES PATENTS

| | | | |
|---|---|---|---|
| 3,748,527 | 7/1973 | Pluck | 315/387 |
| 3,769,542 | 10/1973 | Pieters | 315/399 |

Primary Examiner—Maynard R. Wilbur
Assistant Examiner—G. E. Montone

[57] ABSTRACT

Horizontal deflection circuitry for a television receiver employing a toroidal yoke which has balanced drive windings for reducing the voltage to ground of the yoke's horizontal deflection windings, whereby in accordance with one aspect of the invention the horizontal deflection circuit is configured to permit a ground connection for principal components thereof and to provide a relatively low loss operation, and in accordance with a further aspect of the invention unique circuit configurations are provided to permit a simple connection of the horizontal deflection circuit to a horizontal centering network for supplying a dc centering current component to the horizontal deflection current. With respect to the first aspect, the drive windings comprise primary and secondary windings of the horizontal output transformer which are connected in a series path with the yoke winding and the circuit's s-shape capacitor, and to the circuit's remaining components, this circuit configuration also permitting connection of the s-shape capacitor to a horizontal centering network. In addition, a horizontal deflection circuit having its principal components insulated with respect to ground, is provided with a compensating winding in the connection to the horizontal centering network for cancelling out a part of the drive winding voltage.

6 Claims, 8 Drawing Figures

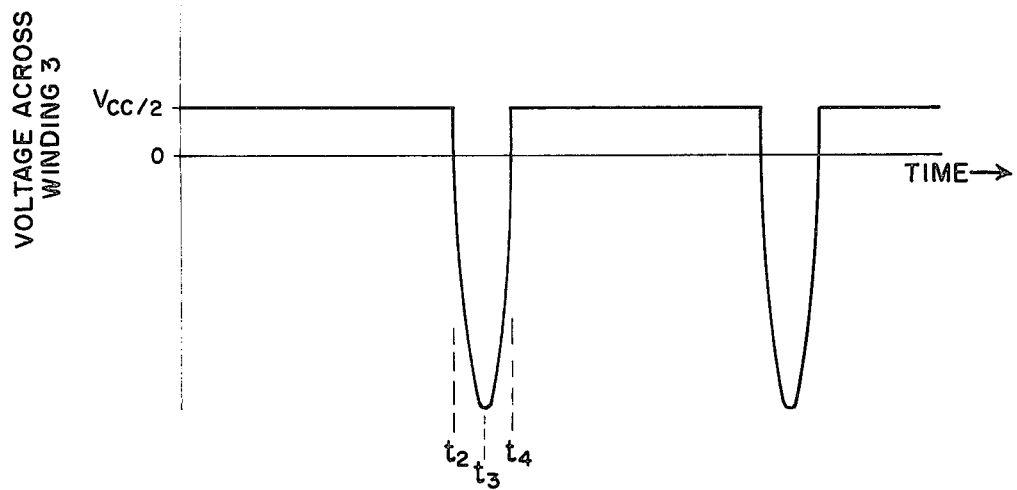
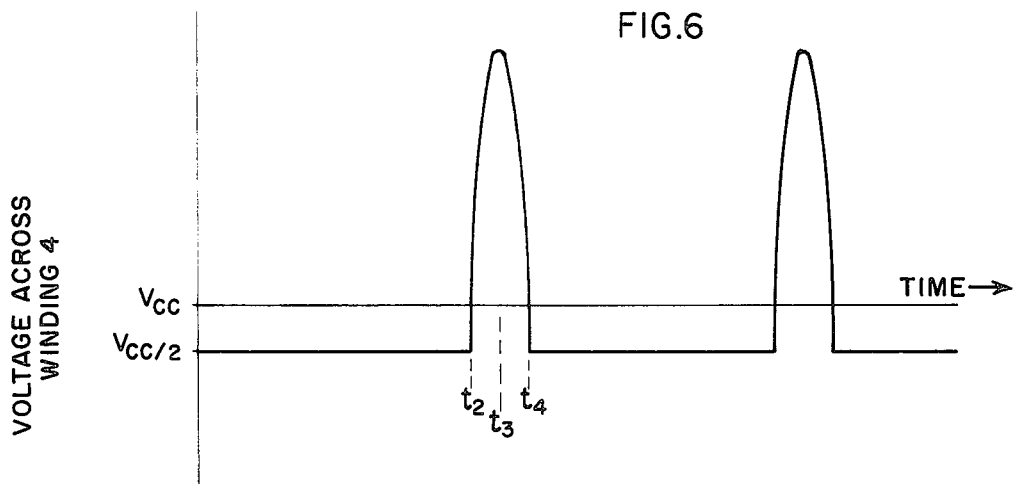

BALANCED DRIVE HORIZONTAL DEFLECTION CIRCUITRY WITH CENTERING

BACKGROUND OF THE INVENTION

The invention relates to horizontal deflection circuits for a television receiver employing toroidal yokes driven by a balanced winding configuration so as to reduce approximately to half the voltage across adjacent wires of the yoke from what they would otherwise be and thereby avoid voltage breakdown between adjacent wires. Toroidal yokes in the deflection circuitry of television receivers include turns of the horizontal deflection winding which are situated immediately adjacent turns of the vertical deflection winding. That portion of the horizontal deflection current which provides retrace of the beam scan is accompanied by relatively high voltage pulses in the horizontal deflection winding, which voltage pulses may cause voltage breakdown between adjacent wires on the toroidal yoke. Voltage breakdown has been avoided in prior art circuitry through the employment of balanced drive windings which generate a voltage between the horizontal deflection, or yoke, winding and ground that is on the order of one half the voltage across the winding itself. In one known circuit the balanced drive is provided by employihg a split primary winding of the horizontal output transformer to drive the yoke winding, whereby the yoke winding and a serially coupled s-shape capacitor is connected between the split windings and in parallel with a switching transistor, clamping diode and a relatively small retrace capacitor, all conventionally a part of the horizontal deflection circuit. In this configuration the transistor, and the components in parallel therewith must each be insulated from ground. In many designs, however, it may be difficult to provide the necessary ground insulation.

The requisite insulation from ground of the s-shape capacitor of the referred to circuit configuration has also precluded a relatively simple connection to a horizontal centering network for supplying centering current for the television raster, and normally requires that such centering current be supplied by a separate dc source.

SUMMARY OF THE INVENTION

It is accordingly an object of the invention to provide a horizontal deflection circuit that employs balanced windings to drive a toroidal yoke and exhibits relatively low drive losses, and which can be employed in equipment designs wherein ground insulation for principal components of the circuit may be difficult to achieve.

It is a further object of the invention to provide for the connection of a horizontal centering network to the horizontal deflection circuit described in the preceding object.

It is also an object of the invention to provide for the connection of a horizontal centering network to a horizontal deflection circuit of the type that employs a split transformer winding to drive the horizontal deflection winding of a toroidal yoke and has principal components necessarily insulated from ground.

These and other objects are accomplished in accordance with one aspect of the invention by a horizontal deflection circuit in which primary and secondary transformer windings are connected in a series path with the circuit's horizontal deflection winding and s-shape capacitor, which component provides appropriate shaping of the generally sawtooth configured horizontal deflection current during the trace period of operation, the primary and secondary windings applying a balanced drive voltage to said deflection winding so that the deflection winding voltage to ground is approximately one half the voltage appearing across the winding. The series path is coupled to a grounded switching circuit that includes the parallel connection of a switching means, retrace capacitor and clamping diode, and upon alternate conduction of the switching means a voltage is applied across said deflection winding accompanied by current buildup within said winding during the trace period, the energy in said current being sequentially transferred between the deflection winding and the retrace capacitor for generating the horizontal deflection current within said deflection winding.

In accordance with a further aspect of the invention, the s-shape capacitor is connected to ground and a horizontal centering network is connected to its ungrounded terminal for supplying a dc centering current.

In accordance with another aspect of the invention, there is provided novel circuit means for connecting a horizontal centering network to a horizontal deflection circuit of the type employing a split primary winding in which principal components of the circuit including the s-shape capacitor are insulated with respect to ground. An additional winding closely coupled to the grounded section of the split primary winding is connected between the s-shape capacitor and centering network for developing a voltage of equal magnitude to the voltage generated in the coupled primary winding section for cancelling out this voltage in the connection to the centering network.

BRIEF DESCRIPTION OF THE DRAWING

The specification concludes with claims particularly pointing out and distinctly claiming the subject matter which is regarded as the invention. It is believed, however, that as to its organization and operation, together with further objects and advantages thereof, the invention may be best understood from the following description of the preferred embodiments taken in connection with the accompanying drawings in which:

FIG. 5 is a graph showing the retrace voltage appearing across the secondary drive winding of FIG. 1;

FIG. 6 is a graph showing the retrace voltage appearing across part of the primary drive winding of FIG. 1;

DESCRIPTION OF PREFERRED EMBODIMENTS

Figure 1:
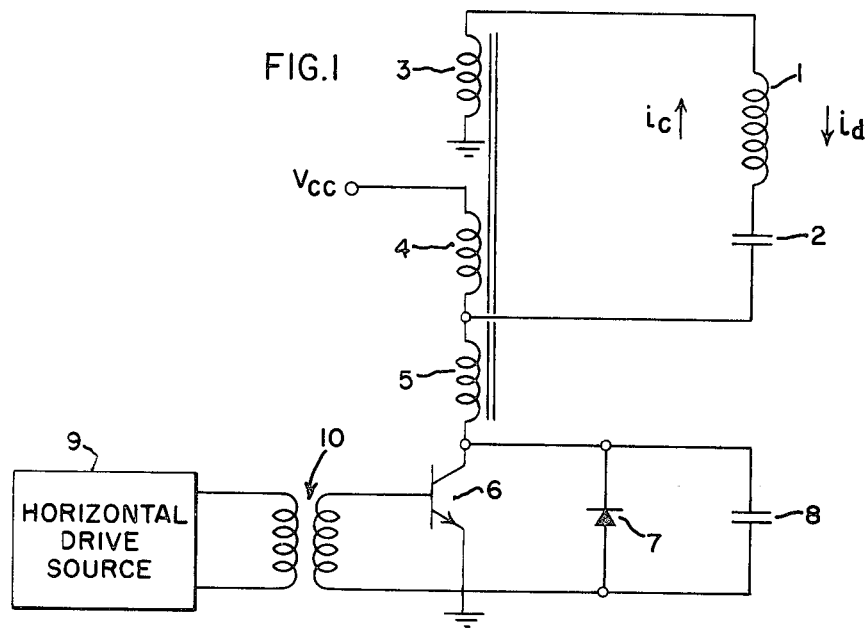
FIG. 1 is a schematic circuit diagram of a first embodiment of a horizontal deflection circuit, in accordance with the invention.

With respect to FIG. 1 of the drawing, in accordance with a first embodiment of the invention there is illustrated a horizontal deflection circuit including a horizontal deflection winding 1 of a toroidal yoke in which is generated a deflection current of a generally sawtooth waveform for providing horizontal scan of the beam in a television picture tube. Toroidal yokes normally contain both horizontal and vertical deflection windings which are wound immediately adjacent one another so as to be subject to voltage breakdown therebetween if the voltage should become excessive. In television receivers of the line rectified type it is convenient to derive the dc voltage for circuits of this type through rectification and filtering of the voltage from available ac power supply, and the magnitude of this dc voltage may tend to cause excessive voltage to be generated across the windings unless precautions are observed. The present circuit has a novel balanced winding configuration which reduces the voltage between the yoke winding 1 and ground, by approximately a factor of two from what it would otherwise be, thereby reducing the chance of voltage breakdown. This voltage reduction is accomplished neither by requiring a ground insulation for principal components of the circuit, nor an inefficient transformer coupling to drive the yoke winding, as is the case in prior art circuits. Thus, a circuit configuration is provided that has principal components of the circuit connected to ground, and is therefore readily applicable to designs where it is difficult to provide a ground insulation. The circuit also makes an ohmic connection between the drive windings and the yoke winding for a relatively efficient drive.

In addition to the yoke winding 1, the circuit includes an s-shape capacitor 2 serially connected to the winding 1 at first terminals thereof. The s-shape capacitor derives its name from the nonlinear current that flows in the deflection winding 1, during the trace period, resembling the letter s, which provides a linearity correction in beam scan. A winding 3, which is the secondary winding of a horizontal output transformer, is connected from ground to the second terminal of winding 1. A winding 4, which is one section of a tapped primary winding of said transformer is connected from a dc voltage source $V_{cc}$ to the second terminal of capacitor 2. Together with winding 1, windings 3 and 4 are connected in a series path with the capacitor 2. Windings 3 and 4 are tightly wound and preferably have an equal number of turns $n$ for generating pulse voltages of equal amplitude and opposite polarity. Thus, during retrace of the beam when large voltage pulses are generated across the windings 3 and 4 the voltage between winding 1 and ground will be approximately equal to that generated in each of these windings, but the voltage appearing across winding 1 is about two times this voltage. It should be noted that although an equal number of turns for the windings 3 and 4 is optimum for balanced drive, the principles of the invention still apply for windings of somewhat unequal turns.

Because source voltage $V_{cc}$ is normally a rectified and filtered voltage taken from a 120 volt ac power supply, or about 140 volts dc, were no additional windings connected in the circuit, there would be generated across winding 4, and therefore between yoke winding 1 and ground, a voltage exceeding the breakdown voltage of the yoke winding. A winding 5, which is the remaining section of the primary winding of said output transformer, is therefore employed to connect the junction of capacitor 2 and winding 4 through a switching transistor 6 to ground. Windings 4 and 5 provide a step down of the drive voltage that is applied across the yoke winding 1. The number of turns for winding 5 is typically equal to that of windings 3 and 4, or $n$ turns.

The switching transistor 6 is shown as an NPN transistor, the collector of which is connected to winding 5 and the emitter connected to ground. In parallel with transistor 6 is connected a clamping diode 7 and a second capacitor 8, which is prominent during the retrace period of beam scan. The cathode of diode 7 is connected to the collector of transistor 6 and its anode is connected to ground. A drive source 9, which generates a square wave signal at the horizontal sweep frequency, is connected through a transformer 10 between the base and emitter electrodes of transistor 6 to cause it to alternately conduct at the horizontal sweep frequency. Alternate conduction and nonconduction of transistor 6 results in the generation of a horizontal deflection current in the yoke winding 1 for deflecting the beam in the horizontal direction during the trace period, and the generation of a short duration current for providing retrace of the beam during the retrace period, which short duration current is accompanied by high voltage pulses generated in the windings.

Figure 2:
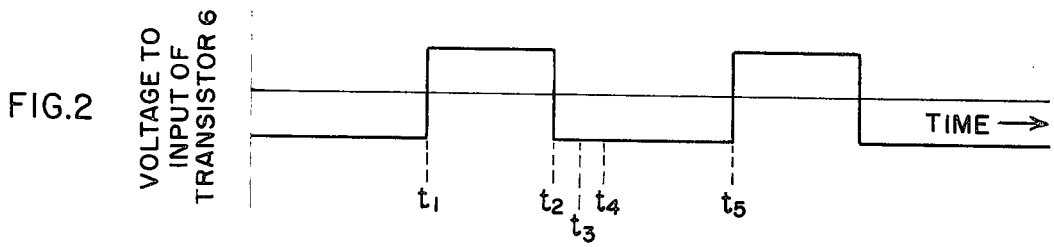
FIG. 2 illustrates the square wave waveform employed to control the operation of the switching transistor of FIG. 1.
Figure 3:
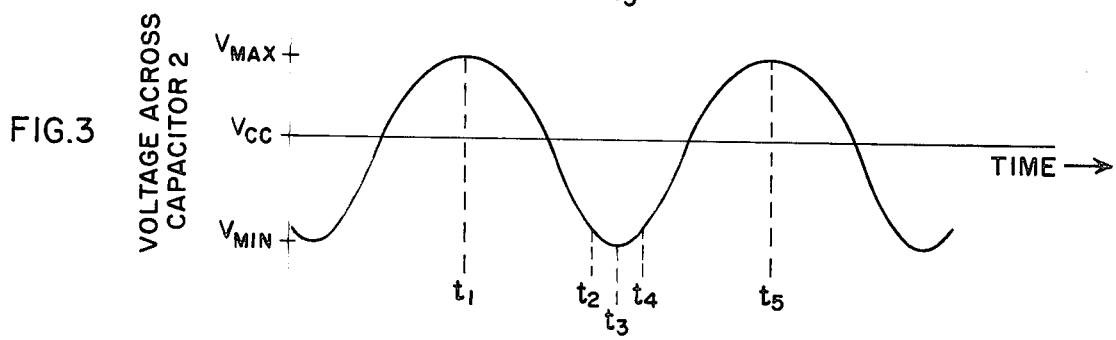
FIG. 3 is a graph of the voltage across the s-shape capacitor of FIG. 1.
Figure 4:
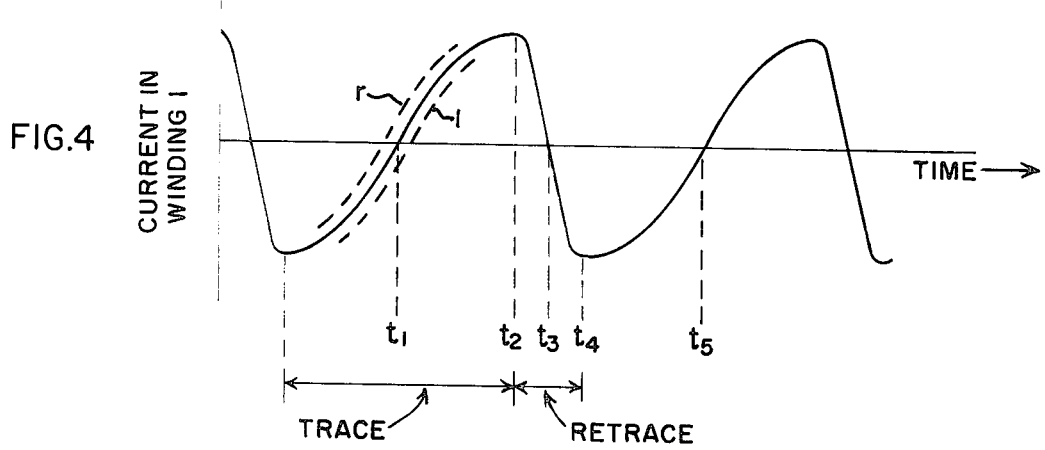
FIG. 4 is a graph of the current through the deflection winding of FIG. 1.

Considering the operation of the circuit of FIG. 1 in greater detail and referring to the graphs of FIGS. 2 through 6, in FIG. 2 is illustrated the square wave output waveform of drive source 9, which is seen to have a duty cycle of somewhat less than 50 percent so as to provide suitable timing for the operation of transistor 6. In going positive at $t_1$, it causes the transistor to turn "on," and in going negative at $t_2$, it causes the transistor to turn "off." At the time when transistor 6 is made to conduct, capacitor 2 will discharge through the transistor 6 in a current path which also includes windings 1, 3 and 5. The discharge current will flow through the yoke winding 1 in the direction shown by the arrow $i_d$ in FIG. 1. At the commencement of the discharge of capacitor 2, the voltage across the capacitor is at a maximum positive value Vmax, as shown by the curve in FIG. 3. As shown by the curve in FIG. 4, the yoke current is seen to be zero at $t_1$. As the discharge process of capacitor 2 continues, its voltage is seen to decrease along a parabolic curve, and the yoke current is seen to increase in a non-linear fashion in accordance with its s-configuration, which is the latter part of the trace period. The capacitor 2 continues to discharge through its average value of $V_{cc}$ to a point just above its negative peak value, when at $t_2$ the transistor 6 is made nonconductive, which initiates the retrace period. It may be pointed out that during trace the voltage across the yoke winding will follow substantially the same curve as shown in FIG. 3, having an average value of $V_{cc}$.

When transistor 6 is turned "off" capacitor 2 continues its discharge but now through a path which charges retrace capacitor 8. Capacitor 8 is much smaller than capacitor 2 so that the discharge current, i.e., yoke current, diminishes rapidly to zero value at time $t_3$. At this time the voltage across the capacitor 2 reaches its maximum peak value at Vmin, and the yoke current reverses and increases rapidly in the negative direction as the capacitor 2 begins charging, represented by the arrow $i_c$ in FIG. 1.

During the abrupt charging and discharging of the retrace capacitor 8 a large voltage pulse is generated in each of the windings 1, 3, 4 and 5. The voltage pulse across winding 3, of negative polarity with respect to its average value of ground, is illustrated in FIG. 5. The voltage pulse across winding 4, of equal magnitude to that in winding 3 but positive polarity with respect to its average value of $V_{cc}$ is illustrated in FIG. 6. The voltage pulse across winding 1 is equal to the difference of the voltages in windings 3 and 4, and is therefore approximately twice the magnitude of the voltage generated in each of the drive windings.

When the voltage across capacitor 8 falls to just below zero, the clamping diode 7 is caused to conduct at time $t_4$. The yoke current then begins to diminish towards zero along the initial portion of the s-curve as the capacitor 2 continues its charge through the diode 7. At time $t_5$ the transistor 6 again conducts, the yoke current passes through zero to become a discharge current, the voltage across capacitor 2 again passes through Vmax, and the process repeats.

Figure 7:
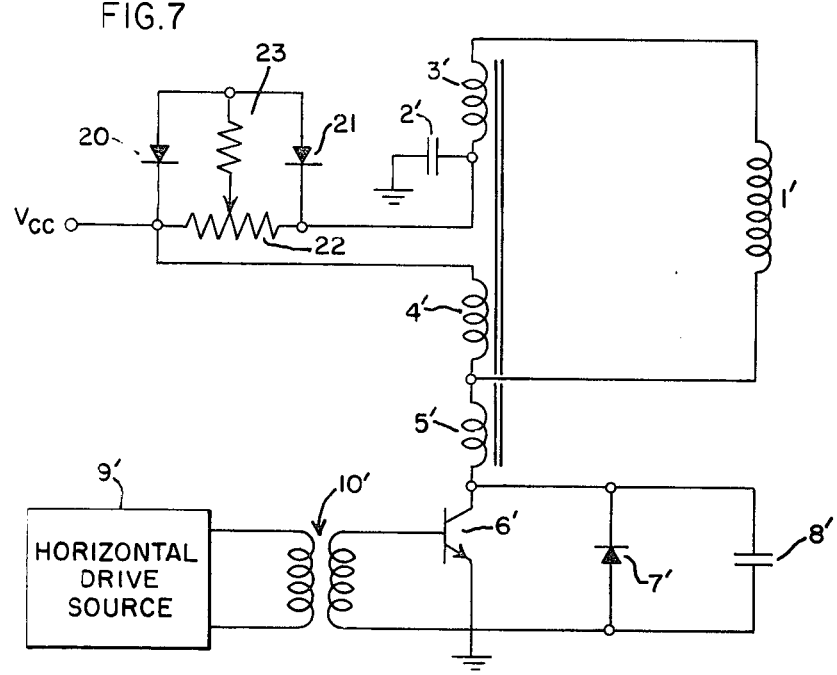
FIG. 7 is a modification of the circuit of FIG. 1 which includes a connection to a horizontal centering network.

Referring now to FIG. 7, there is illustrated a horizontal deflection circuit of similar configuration to that of FIG. 1, but to which has been added a horizontal centering network for providing a dc centering current component to the horizontal deflection current that adjusts the position of the raster in the horizontal direction. Circuit components in FIG. 7 that correspond to components in FIG. 1 are identified with the same reference characters and an added prime notation. In FIG. 7, therefore, the capacitor 2' is seen to be connected between winding 3' and ground to provide a ready connection of the horizontal centering network. This is an alternative connection for capacitor 2' and does not change the basic operation of the circuit from that previously described with respect to FIG. 1.

The horizontal centering network typically includes a pair of diodes 20 and 21 which are poled in the same direction and their anodes joined together. The cathode of diode 20 is connected directly to the voltage source $V_{cc}$ and through a potentiometer 22 to the cathode of diode 21, the latter being connected to the junction of capacitor 2' and winding 3'. A resistor 23 is connected from the junction of the anodes of diodes 20 and 21 to a point on potentiometer 22. Potentiometer 22 has a value substantially larger than that of resistor 23. Current flows through diode 20 when the capacitor voltage is positive with respect to $V_{cc}$ and through diode 21 when the capacitor voltage is negative with respect to $V_{cc}$. Relative current flow through the diodes 20 and 21 is controlled by adjusting the contact point of potentiometer 22. Thus, centering current is derived by rectification of the ac component of the voltage appearing across the capacitor 2. By means of this network a net centering dc current component can be added to the horizontal deflection current flowing through the yoke winding 1' to change its dc level for positioning the television raster in the horizontal direction. In the particular configuration of the horizontal centering network shown, sliding the contact of potentiometer 22 towards diode 20 will result in increasing the current through diode 21 relative to diode 20. This advances the zero intercept of horizontal deflection current curve in FIG. 3, as indicated by the broken line $r$. For the normal beam trace moving from left to right, this will shift the center of the raster to the right. Conversely, sliding the contact of potentiometer 22 towards diode 21 increases the current in diode 20 and will retard the zero intercept of the current curve, indicated by the broken line $l$, for shifting the raster to the left.

In one exemplary embodiment of FIG. 7 the following circuit component values were employed, which are given by way of example and are not intended to be limiting:

| | |
|---|---|
| $V_{cc}$ | 140 volts dc |
| winding 1' | 2 millihenries |
| winding 3' | 68 turns |
| winding 4' | 68 turns |
| winding 5' | 54 turns |
| capacitor 2' | .68 microfarads |
| capacitor 8' | .0043 microfarads |
| resistor 22 | 500 ohms, 3 watts |
| resistor 23 | 50 ohms, 3 watts |

Figure 8:
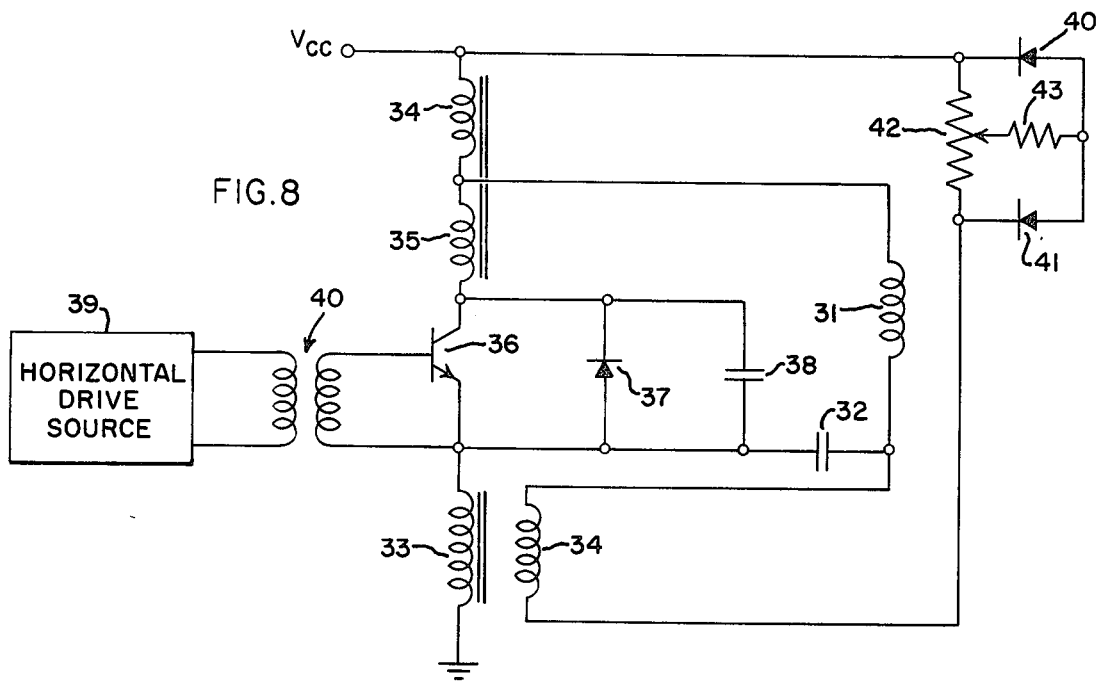
FIG. 8 is a schematic circuit diagram of a further embodiment of a horizontal deflection circuit, in accordance with the invention.

Referring now to FIG. 8, there is illustrated a third embodiment of the invention, one in which a horizontal centering network may be employed in conjunction with a horizontal deflection circuit of the type wherein principal components of the horizontal deflection circuit must be insulated with respect to ground. Formerly, because of the absence of a ground connection for the s-shape capacitor in horizontal deflection circuits of this type, rather complex circuitry was needed for providing a horizontal centering adjustment of the raster, and a separate dc source was normally required for supplying the centering current. The present circuit overcomes such limitation and through a unique circuit configuration provides a relatively simple connection of the centering network to the ungrounded capacitor.

In FIG. 8 the horizontal deflection circuit per se includes a yoke winding 31 and serially connected s-shape capacitor 32. A split primary winding of the horizontal output transformer, comprising lower winding section 33 and upper winding sections 34 and 35, is employed to drive the yoke winding 31. Windings 34 and 35 are connected from a dc voltage source $V_{cc}$ to the collector of an NPN transistor 36, the emitter of said transistor being connected through winding 33 to ground. A clamping diode 37 and a second capacitor 38 are conneced across the collector and emitter electrodes of the transistor 36. The cathode of diode 37 and one terminal of capacitor 38 are connected to the collector of transistor 36, the anode of diode 37 and the other terminal of capacitor 38 being connected to the emitter of said transistor. The serial combination of the yoke winding 31 and capacitor 32 is connected from the junction of windings 34 and 35 to the emitter of transistor 36. A drive source 39 for generating a square wave at the horizontal sweep frequency is connected through a transformer coupling 40 between the base and emitter of transistor 36 to cause alternate conduction of this transistor at the horizontal sweep frequency.

The circuit operates in similar fashion as described with respect to FIG. 1 for generating a deflection current through the yoke winding 31. Windings 33 and 34 preferably have each $n$ turns for providing a balanced drive to yoke winding 31, with the voltages generated in these windings being about one half that generated in the yoke winding. The winding 35 provides a step down of the drive voltage applied to the yoke winding 31, and has but a few turns for matching the drive voltage to the yoke inductance for the purpose of producing a deflection current of correct value.

The horizontal centering network, of similar configuration to that considered in respect to FIG. 7, typically includes a pair of diodes 40 and 41 of the same polarity, having their anodes joined together. The cathode of diode 40 is connected to the voltage source $V_{cc}$ and is connected through a potentiometer 42 to the cathode of diode 41. A resistor 43 is connected from the junction of the anodes of diodes 40 and 41 to a sliding contact point of potentiometer 42.

In accordance with this aspect of the invention, a winding 44 is employed to couple the capacitor 32 to the horizontal centering network, the winding 44 being connected from the junction of the yoke winding 31 and capacitor 32 to the junction of resistor 42 and the cathode of diode 41. Winding 44 has the same number of turns as winding 33, namely $n$ turns, and is in close coupling relationship therewith so that voltages of substantially the same magnitude are generated across windings 33 and 44. Preferably the windings 33 and 44 are bifilar windings.

Operation of the centering network itself is similar to that described for FIG. 7. However, the voltage induced in winding 33, which appears at the junction of winding 31 and capacitor 32, is cancelled out in the connection to the horizontal centering network by the voltage generated in winding 44. Thus, the centering current component is a function of the rectified ac voltage across the capacitor 32 as determined by the setting of the potentiometer 42.

In one exemplary embodiment of FIG. 8 the following circuit component values were employed, which are given by way of example and not intended to be limiting:

| | |
|---|---|
| $V_{cc}$ | 140 volts dc |
| winding 31 | 1.4 millihenries |
| winding 33 | 61 turns |
| winding 34 | 56 turns |
| winding 35 | 5 turns |
| winding 44 | 61 turns |
| capacitor 32 | .68 microfarads |
| capacitor 38 | .0056 microfarads |
| resistor 42 | 500 ohms, 3 watts |
| resistor 43 | 50 ohms, 3 watts |

Although preferred embodiments of the invention have been shown and described, various other embodiments and modifications thereof will be apparent to those skilled in the art, and will fall within the scope of this invention as defined in the following claims.

What is claimed as new and desired to be secured by Letters Patent of the United States is:

1. A horizontal deflection circuit exhibiting in its operation a long trace period and short retrace period, and in which a balanced drive voltage is supplied to the circuit's horizontal deflection winding so as to reduce the magnitude of the voltage between the deflection winding and ground and thereby avoid voltage breakdown during said retrace period when a large voltage pulse tends to appear across the deflection winding, comprising:
   a. first winding means,
   b. second winding means magnetically coupled to said first winding means so that voltages of opposite polarity are generated across said first and second winding means in response to energy applied to said first winding means,
   c. a first capacitor,
   d. said horizontal deflection winding, said first and second winding means and said first capacitor being connected in a series path between an energy source and a common terminal so that the difference of the voltages generated across said first and second winding means is distributed across the horizontal deflection winding and said first capacitor, said first capacitor being connected between said second winding means and said common terminal,
   e. a switching circuit including parallel current paths one of which includes a second capacitor, each of said parallel circuit paths having a direct connection to said common terminal,
   f. coupling means for coupling said series path to said switching circuit, whereby alternate operation of said switching circuit causes a voltage to be applied across said deflection winding accompanied by current buildup within said deflection winding during a portion of said trace period, the energy in which is sequentially transferred between said deflection winding and said second capacitor so as to generate in said deflecton winding a horizontal deflection current of generally sawtooth waveform that is shaped by said first capacitor, and
   g. a centering network for providing a DC centering current component to said horizontal deflection current, said centering circuit being connected at one end to the junction of said first capacitor and said second winding means and at the other end to said energy source.

2. A horizontal deflection circuit as in claim 1 wherein said centering network includes a pair of diodes and an adjustable resistance means connected therebetween for deriving the centering current through rectification of the ac component of the voltage across said first capacitor.

3. A horizontal deflection circuit exhibiting in its operation a long trace period and short retrace period, and in which a balanced drive voltage is supplied to the circuit's horizontal winding so as to reduce the magnitude of the voltage between the deflection winding and ground and thereby avoid voltage breakdown during said retrace period when a large voltage pulse tends to appear across the winding, comprising:
   a. a split transformer winding having a first winding section connected to an energy source and a second winding section connected to a common terminal,
   b. a series path including a first capacitor and said deflection winding,
   c. first coupling means for coupling said series path between said first and second winding sections so that the difference of the voltages generated across said first and second winding sections is distributed across said deflection winding and said first capacitor,
   d. a switching circuit including parallel current paths one of which includes a second capacitor,
   e. second coupling means for coupling said switching circuit between said first and second winding sections, whereby alternate operation of said switching circuit causes a voltage to be applied across said deflection winding accompanied by current buildup within said deflection winding during a portion of said trace period, the energy in which is sequentially transferred between said deflection winding and said second capacitor so as to generate in said deflection winding a horizontal deflection current of generally sawtooth waveform that is shaped by said first capacitor,
   f. a horizontal centering network for providing a dc centering current component to the horizontal deflection current, and
   g. inductive means for coupling the first capacitor to said centering network, said inductive means generating a voltage of approximately equal magnitude to the voltage generated in said second winding section for cancelling out this voltage in the connection to the centering network.

4. A horizontal deflection circuit as in claim 3 wherein said inductive means comprises a further transformer winding mechanically coupled to said second winding section and having the same number of turns as said second horizontal section.

5. A horizontal deflection circuit as in claim 4 wherein said centering network includes a pair of diodes and an adjustable resistance means connected therebetween for deriving the centering current through rectification of the ac component of the voltage across said first capacitor.

6. A horizontal deflection circuit as in claim 4 wherein said second coupling means comprises a further winding section of said split transformer winding, wherein said first and second winding sections have approximately the same number of turns and said further winding section has a substantially less number of turns for adjusting the magnitude of the voltage applied across said deflection winding.

* * * * *